United States Patent Office 3,769,241
Patented Oct. 30, 1973

3,769,241
OXIDATION CATALYSTS
David Gordon Stewart, Epsom, and William John Ball, Capel, England, and Rowland Harris Jenkins, Dollar, Scotland, assignors to BP Chemicals Limited, London, England
No Drawing. Filed Mar. 17, 1971, Ser. No. 125,356
Claims priority, application Great Britain, Mar. 20, 1970, 13,584/70
Int. Cl. B01j 11/06, 11/22
U.S. Cl. 252—469
7 Claims

ABSTRACT OF THE DISCLOSURE

Granular or pelleted catalysts suitable for use in the vapour phase oxidation of organic compounds containing antimony and tin as oxide compositions which have been pretreated in powder form by heating in an inert atmosphere to 200 to 500° C. and thereafter pelleted and reheated in molecular oxygen to 550 to 1000° C.

---

The present invention relates to the hardening of catalytic compositions and in particular to the hardening of catalytic compositions containing antimony and tin.

Catalysts comprising oxide compositions containing antimony and tin are well known. Thus British patent specification No. 904,602 (Distillers) describes and claims such catalysts which may be used for catalysing the vapour phase oxidation of organic hydrocarbons such as the oxidation of propylene to produce acrolein and/or acrylic acid or of isobutene to produce methacrolein and/or methacrylic acid, or for catalysing the vapour phase reaction of propylene (or isobutene) or of acrolein (or methacrolein) with oxygen and ammonia to product acrylonitrile (or methacrylonitrile), or for catalysing the vapour phase oxidative dehydrogenation of mono-olefins for example such as butenes to produce diolefins such as butadiene or for catalysing the reaction of methanol and ammonia to product hydrogen cyanide.

In carrying out reactions of the above type on the industrial scale with pelleted or granulated catalysts it is essential that the pellets or granules should be physically robust particularly in a fluidised bed system. If the pellets or granules are soft and easily reduced to dusts and fines, this causes blockages and unequal flow of the gaseous reactants through the reactor tubes or beds.

It has now been found that the physical hardness of the pelleted catalysts may be increased by employing a particular preheat treatment prior to pelleting or granulating.

Accordingly the present invention is a catalyst in pellet or granular form, suitable for catalysing the vapour phase oxidation of organic compounds, which comprises an oxide composition containing antimony and tin pretreated whilst in powder form prior to pelleting or granulation by heating in an inert atmosphere to a temperature in the range of 200° C. to 500° C., and heated after pelleting or granulation to a temperature in the range 550° to 1000° C. in a molecular oxygen containing gas.

The catalytic composition may contain one or more additional combined metals to the antimony and tin. These metals are preferably polyvalent metals, and are, for example, titanium, chromium, iron, cobalt, nickel, copper, vanadium, molybdenum, uranium and/or tungsten. The catalytic composition may be regarded either as a mixture of the various metal oxides or as an oxygen-containing compound or compounds of the metals; under the reaction conditions the composition may contain either or both forms.

The components of the catalyst may be mixed in any order, and the catalyst may be prepared in various ways. For instance, compounds of the antimony and tin together with compounds of the polyvalent metal or metals if this component is to be present in the final composition may be co-precipitated from a mixed aqueous solution of their soluble salts, for example, the chlorides. In this case the precipitation may be carried out by the addition of ammonia. The precipitate is then thoroughly washed with water to remove soluble salts, for example, ammonium chloride, and heated if necessary to convert the compounds of the metals to the oxides.

Alternatively an antimony/tin oxide composition may be prepared and the polyvalent metal or metals, if this component is to be added, subsequently incorporated. The antimony/tin oxide composition may be prepared by co-precipitation as before or by intimately mixing one or more oxides of antimony such as trioxide, tetroxide, pentoxide or a hydrated oxide with one or more oxides of tin. Mixtures of the oxides of hydrated oxides, for example, those formed by the action of aqueous nitric acid on antimony and tin metals or on mixtures of metals may also be used. In this case the mixed oxide composition contains residual nitrate ion and this may be removed by washing either with hot water or with a dilute solution of ammonia or an organic base. Polyvalent metal or metals may then be added to the mixture, for example, as an insoluble neutral compound which is convertible to oxide on heating. Examples of such insoluble neutral compounds are the hydroxides, carbonates, and hydrated oxides. The composition is then finally heated to convert any compounds present to the corresponding oxides.

Alternatively, the polyvalent metal or metals may be added to the antimony/tin composition in the form of a soluble salt or salts such as a nitrate, formate, acetate, chloride or sulphate, the oxides then being precipitated by the addition of a base such as ammonia.

The proportions of the various components of the composition may vary within moderately wide limits. Suitably the composition contains an atomic ratio of antimony to tin within the range 0.1:1 and 20:1. When an additional combined polyvalent metal is present in the composition it is preferred to have an atomic ratio of antimony to polyvalent metal within the range 0.1:1 and 20:1.

By whichever method the catalytic composition is prepared it is subjected after pelleting or granulation to a heat-treatment at a temperature within the range 550° to 1000° C., preferably 700° to 900° C., and more especially between 750° and 850° C., in a molecular oxygen containing gas, e.g. air.

In accordance with the invention the catalytic composition is heated in an inert atmosphere to a temperature in the range 200° to 500° C. prior to pelleting or granulation. The inert atmosphere may be any which does not react with the composition. Suitable examples of gases which may constitute an inert atmosphere are nitrogen or argon. The period of heating may vary within moderately wide limits and may depend to a certain extent upon the nature of the additional combined polyvalent metal if present in the composition.

The present invention is listed further with reference to the following examples.

EXAMPLE 1

Antimony:tin (4:1) catalyst

Powdered tin (949 parts by weight) was added during 30 minutes to a stirred suspension of commercial antimony trioxide (4664 parts by weight) in a mixture of concentrated 70% nitric acid (5680 parts by weight) and water (12,000 parts by weight) at 95° to 100° C.; the mixture stirred for 15 minutes cooled to 40° C. and filtered. The filter cake was suspended in water (10,000 parts by weight) at 60° C. and the mixture brought to pH 8 by the addition of ammonia. The mixture was filtered and the solid washed once by resuspension for 15 minutes in water (10,000 parts by weight), and filtered. The cake was dried at 120° C. for 16 hours and divided into two portions.

Portion A was broken down to pass 18 mesh (B.S.S.), mixed with graphite (1% by weight), pelleted, 5/32 in. pellets) and heated in air in a muffle furnace. The furnace temperature was programmed from 200° C. to 850° C. at 20° per hour and maintained at 850° C. for 16 hours. The crush strengths before and after heat-treatment were 7 and 25 lb. wt. respectively.

Portion A was broken down to pass 18 mesh (B.S.S.), and heated at 400° C. for 16 hours in an atmosphere of nitrogen. The dry powder was mixed with graphite (1% by weight), pelleted (5/32 in. pellets) and heated in air in a muffle furnace. The furnace temperature was programmed from 200° to 850° C. at 20° C. per hour and maintained at 850° C. for 16 hours. The crush strengths before and after heat-treatment were 7 and 31 lb. wt. respectively.

EXAMPLE 2

Antimony:tin:vanadium 2:1:1) catalyst

Powdered tin (59.4 parts by weight) was added during 15 minutes to a stirred suspension of commercial antimony trioxide (145.8 parts by weight) in a mixture of concentrated 70% nitric acid (335 parts by weight) and water (750 parts by weight) at 95 to 100° C.; the mixture stirred for 15 minutes cooled to 40° C. and filtered. The filter-cake was suspended in water (750 ml.) at 60° C. and the mixture brought to pH 8 by the addition of ammonia. The mixture was filtered and the solid washed once by resuspension for 15 minutes in water (750 parts by weight), and filtered. The cake was then mixed for one hour with a slurry of vanadium pentoxide (45.5 parts by weight) in water, dried at 120° C. for 16 hours and divided into two portions.

Portion A was broken down to pass 18 mesh (B.S.S.), mixed with graphite (1% by weight), pelleted (5/32 in. pellets) and heated in air in a muffle furnace. The furnace temperature was programmed from 200° C. to 850° C. at 20° per hour and maintained at 850° C. for 16 hours. The crush strengths before and after heat-treatment were 4 and 8 lb. wt. respectively.

Portion B was broken down to pass 18 mesh (B.S.S.) and heated at 400° C. for 16 hours in an atmosphere of nitrogen. The dry powder was mixed with graphite (1% by weight), pelleted (5/32 in. pellets) and heated in air in a muffle furnace. The furnace temperature was programmed from 200° to 850° C. at 20° per hour and maintained at 850° for 16 hours. The crush strengths before and after heat-treatment were 4 and 17 lb. wt. respectively.

EXAMPLE 3

Antimony:tin:vanadium (2:1:1) catalyst

The antimony-tin oxide mixture was prepared as described in Example 1 using commercial antimony trioxide (9328 parts by weight) and powdered tin (3796 parts by weight). After washing the mixture was mixed with ammonium metavanadate paste (4286 parts by weight. Vanadium content 38% (w./w.) and water for one hour. The slurry was dried at 120° C. for 16 hours and divided into a number of portions. These were pelleted (5/32 in. pellets) after heat-treatment in nitrogen of 200°/16 hours, 300°/16 hours, 350°/16 hours, 400°/16 hours and 500°/16 hours and then heated in air in a muffle furnace. The furnace temperature was programmed from 200° to 850° C. at 20° per hour and maintained at 850° C. for 16 hours. The crush strengths obtained are given in the following table:

| Heat-treatment temperature in nitrogen, degrees/hours | Crush strengths, lb. wt. | |
|---|---|---|
| | Before heat-treatment | After 850° C./16 hours |
| None | 14 | 13 |
| 200/16 | 6 | 8 |
| 300/16 | 12 | 17 |
| 350/16 | 12 | 31 |
| 400/16 | 12 | 40 |
| 500/16 | 13 | >59 |

EXAMPLE 4

Antimony:tin:iron (4:1:0.25) catalyst

Powdered tin (59.4 parts by weight) was added during 15 minutes to a stirred suspension of commercial antimony trioxide (291.5 parts by weight) in a mixture of concentrated 70% nitric acid (355 parts by weight) and water (750 parts by weight) at 95° to 100° C.; the mixture stirred for 15 minutes, cooled to 40° C. and filtered. The filter-cake was suspended in a solution of ferric nitrate nonahydrate (50.5 parts by weight) in water (750 parts by weight) at 60° C. and the mixture brought to pH 8 by the addition of ammonia. The mixture was filtered and the solid washed once by resuspension for 15 minutes in water (750 parts by weight), and filtered. The cake was dried at 120° C. for 16 hours and divided into two portions.

Portion A was broken down to pass 18 mesh (B.S.S.), mixed with graphite (1% by weight), pelleted (5/32 in. pellets) and heated in air in a muffle furnace. The furnace temperature was programmed from 200° to 825° C. at 20° per hour and maintained at 825° C. for 16 hours. The crush strengths before and after heat-treatment were 4 and 8 lb. wt. respectively.

Portion B was broken down to pass 18 mesh (B.S.S.) and heated at 400° C. for 16 hours in an atmosphere of nitrogen. The dry powder was mixed with graphite (1% by weight), pelleted (5/32 in. pellets) and heated in air in a muffle furnace. The furnace temperature was programmed from 200° to 825° at 20° per hour and maintained at 825° C. for 16 hours. The crush strengths before and after heat-treatment were 3 and 10 lb. wt. respectively.

EXAMPLE 5

Antimony:tin:vanadium-iron (3:1:0.4) catalyst

The antimony-tin-iron mixture was prepared as described in Example 4 using commercial antimony trioxide (3498 parts by weight), powdered tin (949 parts by weight) and ferric nitrate nonahydrate (1293 parts by weight). After washing the mixture was mixed with ammonium metavanadate paste (1027 parts by weight). Vanadium content 39.7% (w./w.) and water for one hour. The slurry was dried at 120° C. for 16 hours and divided into two portions.

Portion A was broken down to pass 18 mesh (B.S.S.), mixed with graphite (1% by weight), pelleted (5/32 in. pellets) and heated in air in a muffle furnace. The furnace temperature was programmed from 200° to 850° C. at 20° per hour and maintained at 850° C. for 16 hours. The crush strengths before and after heat-treatment were 22 and 7 lb. wt. respectively.

Portion B was broken down to pass 18 mesh (B.S.S.) and heated at 400° C. for 16 hours in an atmosphere of nitrogen. The dry powder was mixed with graphite (1% by weight), pelleted (5/32 in. pellets) and heated in air in a muffle furnace. The furnace temperature was programmed from 200° to 850° C. at 20° per hour and maintained at 850° C. for 16 hours. The crush strengths before and after heat-treatment were 12 and 28 lbs. wt. respectively.

We claim:
1. A catalyst in pellet form suitable for catalysing the vapor phase oxidation of organic compounds, which comprises an oxide composition containing antimony and tin which has been prepared by a process in which the improvement resides in pretreating whilst in powder form prior to pelleting or granulation by heating in an inert atmosphere to a temperature in the range of 200 to 500° C., and heating after pelleting to a temperature in the range 550° to 1000° C., in a molecular oxygen containing gas.

2. A catalyst as claimed in claim 1 wherein said oxide composition contains an oxide composition of an additional metal or metals selected from titanium, chromium, iron, cobalt, nickel, copper, vanadium, molybdenum, uranium, and tungsten.

3. A catalyst as claimed in claim 1 wherein the atomic ratio of antimony to tin contained therein is within the range 0.1:1 and 20:1.

4. A catalyst as claimed in claim 2 wherein the atomic ratio of antimony to additional metal contained therein is within the range 0.1:1 and 20:1.

5. A catalyst as claimed in claim 1 wherein the inert atmosphere is nitrogen or argon.

6. A catalyst as claimed in claim 1 wherein the heat treatment after pelleting or granulation is carried out at a temperature in the range 700 to 900° C.

7. A catalyst as claimed in claim 6 wherein the heat treatment is carried out at a temperature in the range 750 to 850° C.

References Cited

UNITED STATES PATENTS

| | | | |
|---|---|---|---|
| 3,094,565 | 6/1963 | Bethell et al. | 252—461 X |
| 3,326,819 | 6/1967 | Newman | 252—461 |
| 3,525,701 | 8/1970 | Barclay et al. | 252—461 |
| 3,094,552 | 6/1963 | Wood | 252—461 X |
| 3,269,957 | 8/1966 | Bethell | 252—461 X |

FOREIGN PATENTS

| | | | |
|---|---|---|---|
| 904,602 | 8/1962 | Great Britain | 252—461 |

DANIEL E. WYMAN, Primary Examiner

W. J. SHINE, Assistant Examiner

U.S. Cl. X.R.

252—461, 470

UNITED STATES PATENT OFFICE
CERTIFICATE OF CORRECTION

BP 3092

Patent No. 3,769,241    Dated October 30, 1973

Inventor(s) DAVID GORDON STEWART, WILLIAM JOHN BALL and ROWLAND HARRIS JENKINS

It is certified that error appears in the above-identified patent and that said Letters Patent are hereby corrected as shown below:

Col. 4, line 45, change "(3:1:0.4)" to read --(3:1:1:0.4)--

Signed and sealed this 9th day of April 1974.

(SEAL)
Attest:

EDWARD M. FLETCHER, JR.
Attesting Officer

C. MARSHALL DANN
Commissioner of Patents